(No Model.)

E. FOERSTER.

INSERTIBLE DIAMOND SAW TOOTH.

No. 297,776. Patented Apr. 29, 1884.

WITNESSES:

INVENTOR
Emanuel Foerster
BY
ATTORNEYS.

UNITED STATES PATENT OFFICE.

EMANUEL FOERSTER, OF NEW YORK, N. Y.

INSERTIBLE DIAMOND SAW-TOOTH.

SPECIFICATION forming part of Letters Patent No. 297,776, dated April 29, 1884.

Application filed October 6, 1883. (No model.)

*To all whom it may concern:*

Be it known that I, EMANUEL FOERSTER, of the city, county, and State of New York, have invented certain new and useful Improvements in Insertible Diamond Saw-Teeth, of which the following is a specification.

The object of this invention is to furnish for stone-saws, rock-drills, and other stone-working implements an improved insertible diamond saw tooth or bit by which the diamonds are held in a more permanent and reliable manner, so as to be less liable to get loose in the saw or bit; and the invention consists of an insertible tooth, which is riveted or otherwise fastened into a recess of the saw-blade and made of steel or iron, and of an auxiliary holder that is set into a recess of the tooth and made of steel or other metal, to which a hard temper can be applied after the diamonds are set and braced.

Figure 1:
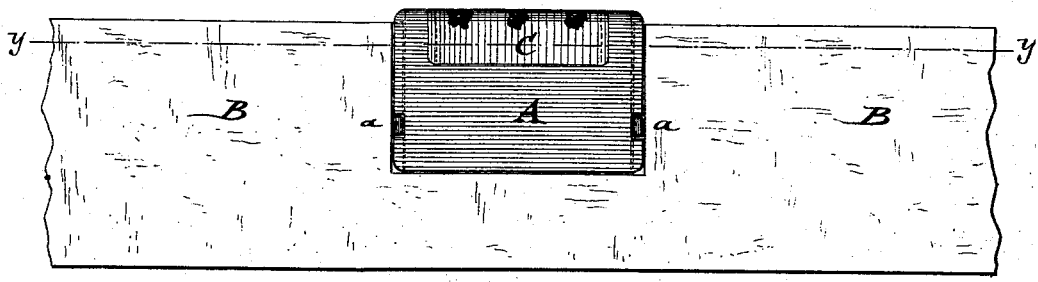
Figure 2:

In the accompanying drawings, Figure 1 represents a side view of a saw-blade with my improved insertible diamond tooth. Fig. 2 is a vertical longitudinal section of the same on line $y\,y$, Fig. 1.

Similar letters of reference indicate corresponding parts.

B represents the saw-blade, and A an insertible saw-tooth, which is set into a recess of the blade B and fitted, by means of end grooves, to the tapering edges of the recess of the saw-blade. The tooth A is then fastened by transverse rivets, keys, or other suitable fastening devices, $a$, to the blade B. The insertible tooth A is made of steel, to which a comparatively soft temper is imparted, or of iron, so that the same can be riveted to the saw-blade without danger of getting split or injured by this operation. The tooth A is provided with a recess along a part of its cutting-edge, into which recess is inserted an auxiliary tooth or holder, C, of smaller size. The cutting-diamonds are inserted into sockets or recesses of this holder in any approved manner, preferably, however, by the method patented heretofore to me under date of June 12, 1883, No. 279,369. After the diamonds have been inserted into and properly brazed to the auxiliary holder C, the steel of the holder is hard tempered, so that a strong and durable connection between the diamonds and the holder is obtained. The auxiliary saw-tooth C is fitted by grooved ends to the tapering edges of the recess of the holder A in the same manner in which the same is fitted into the recess of the saw-blade, the holder being then shrunk into the tooth A, so as to be firmly secured to the same. By making the insertible saw-tooth of two pieces—namely, of a smaller hard-tempered section, that forms the holder for the diamonds, and is shrunk into the larger soft-tempered main part—the danger of splitting or otherwise injuring the tooth while it is riveted to the saw-blade is in a great measure obviated, and thereby a more durable diamond saw-tooth obtained.

I am aware of the patent granted to L. Dow for diamond stone-drills, No. 52,148, on January 23, 1866, and of the patent granted to W. P. Miller for saws, No. 151,043, on May 19, 1874; and I therefore do not claim the features shown therein.

Having thus described my invention, I claim as new and desire to secure by Letters Patent—

The combination, with a recessed saw-blade, B, of an insertible saw-tooth, A, means for securing the same to the recessed saw-blade, said tooth being made of soft-tempered steel, and of an auxiliary holder or holders for the diamonds, said holder or holders being made of hard-tempered material and shrunk into the recess of the saw-tooth, substantially as set forth.

In testimony that I claim the foregoing as my invention I have signed my name in presence of two subscribing witnesses.

EMANUEL FOERSTER.

Witnesses:
PAUL GOEPEL,
SIDNEY MANN.